3,047,596
6α-HALOGEN-9α-HALOGEN-Δ¹,⁴-PREGNADIENE-3-ONE COMPOUNDS

Dale R. Hoff, Cranford, and Joyce M. Korntved, Metuchen, N.J., assignors to Merck & Co., Inc., Rahway, N.J., a corporation of New Jersey
No Drawing. Filed Nov. 17, 1959, Ser. No. 853,451
11 Claims. (Cl. 260—397.45)

This invention relates to the 6-halogen derivatives of the $\Delta^{1,4}$-3-keto-steroids, and to a new process for the preparation of these derivatives. More particularly, it relates to a process for the preparation of intermediate enol-esters of 9α-halogen-$\Delta^{1,4}$-pregnadiene-3-ones and for the halogenation of said enol-esters to give the 6α-halogen-9α-halogen-$\Delta^{1,4}$-pregnadiene-3-ones.

The products prepared according to the invention may find use as therapeutics, or as intermediates for the preparation of compounds having therapeutic utility. For example, the hydrogen halide may be split off from the 6-halogen substituted steroid to give the unsaturated derivative.

Processes are known for the manufacture of the 6-halogen derivatives of $\Delta^4$-3-keto-steroids. A suitable method for forming the 6-halogen derivative is to first prepare an enol-ester or enol-ether of the $\Delta^4$-3-keto-steroid and then halogenate said enol derivative. The 6-position of the steroid is activated in the 3,5-diene-3-ol ester or ether, and halogen presumably adds selectively to the terminal position (carbon 6) of the conjugated system. Structural formulas for these compounds are represented by I (the 3-keto derivative of a $\Delta^4$-steroid), II (the enol-ester or ether) and III (the 6-halogen derivative) of the steroid compound.

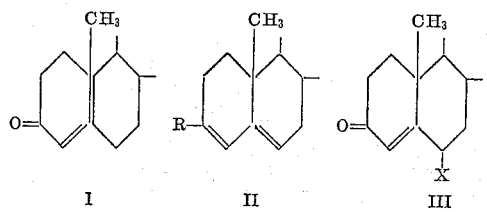

R stands for an esterified or an etherified hydroxyl group, and X represents chlorine or bromine.

Attempts to apply the above described method to the formation of 6-halogen derivatives of the $\Delta^{1,4}$-pregnadiene-3-ones are ordinarily unsuccessful due to the tendency of the $\Delta^{1,4}$-pregnadiene-3-ones to undergo rearrangements within the molecule under the reacting conditions employed. For example, the presence of the additional conjugated double bond at $\Delta^1$ may result in migration of the angular methyl group with concomitant aromatization of the ring, as shown below.

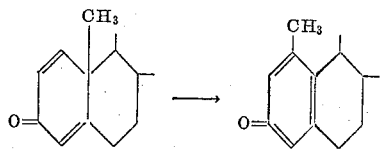

This "dienone-phenol rearrangement" results in products which have altered biological activity. Moreover, the 6-position of the steroid ring is no longer activated by the presence of the conjugated double bond system so as to result in selective halogenation at this position.

Due to the tendency toward rearrangements, which is typified by the above formulas, no simple, straight-forward way has been developed for selectively halogenating the $\Delta^{1,4}$-pregnadiene-3-ones at the 6-position, in good overall yields, and without interfering side reactions with other groups which may be present in the molecule.

It is an object of this invention to provide a simplified procedure for forming the 6-halogen derivatives of $\Delta^{1,4}$-3-keto-steroids, and particularly of the 9α-halogen-$\Delta^{1,4}$-pregnadiene-3-ones. It is another object to provide such a process whereby the 6-halogen derivatives can be formed in good yields under mild conditions so that no undesirable side reactions occur. It is a further object of this invention to provide such a process which can be applied to a broad group of steroids, and which will make available new 6-halogen derivatives of certain $\Delta^{1,4}$-3-keto-steroids which are not obtainable in appreciable quantities, by other methods. Other objects and advantages of the invention will appear hereinafter.

It has now been found, unexpectedly, that the 3-enol-esters of the 9α-halogen-$\Delta^{1,4}$-pregnadiene-3-ones, i.e. the 9α-halogen-$\Delta^{1,3,5}$-pregnatriene-3-ol-3-acylates, can be prepared by reaction of the 9α-halogen steroid with a suitable acylating agent under controlled operating conditions.

This procedure will result in good conversions and high overall yields of the desired 3-enol-esters without interfering side reactions, or undesirable rearrangements in the steroid molecule. The 3-enol-ester, once formed, is then halogenated to the 6-halogen derivative. It is an advantage of this invention that the rate of the halogenation reaction, using the 3-enol-ester derivative, is greatly enhanced. In many cases it is due to this expedient that acceptable yields become possible at all.

Based on theoretical considerations it is presumed that the 3-enol-ester of the 9-halogen-$\Delta^{1,3,5}$-pregnatriene thus formed again results in the activation of the 6-position of the steroid ring, thus facilitating selective halogenation at this position. However, it is not desired to limit the present invention to any particular theory of action.

The aliphatic ester of the 3-enol form of the 9α-halogen-$\Delta^{1,4}$-pregnadiene-3-one is conveniently obtained by heating the steroid with an aliphatic acid anhydride and an organic sulfonic acid at a temperature in the range of about 90–100° C. for several hours. The aliphatic acid anhydride to be used corresponds to the ester derivative to be formed. Lower aliphatic acid anhydrides are preferred. Acetic acid anhydride is especially preferred because of its availability and low cost. Propionic acid anhydride may also be practical. Some typical sulfonic acids which are suitable for use with the aliphatic acid anhydride are benzene-sulfonic acid, p-toluene-sulfonic acid and methanesulfonic acid.

The aromatic ester of the 3-enol form of the 9α-halogen-$\Delta^{1,4}$-pregnadiene-3-one is conveniently prepared by heating the steroid with an aryl acid chloride, such as benzoyl chloride, p-nitrobenzoyl chloride or p-chlorobenzoyl chloride, in the presence of an organic base. Some typical examples of such bases are pyridine, the N-alkylmorpholines, N-alkylpiperidines, lutidines, collidines and trialkylamines. The temperature is maintained at about 50° C. for at least one-half hour.

In the second step of the reaction, the 9α-halogen-$\Delta^{1,3,5}$-pregnatriene-3-enol-ester is halogenated, preferably by treatment with a dicarboxylic acid imide derivative which is halogenated at the nitrogen atom, i.e. substituted by chlorine or bromine. Typical examples of such halogenating agents are N-halogen-succinimide, N-halogen-phthalimide, N-halogen-parabamic acid, N-halogen-cyanuric acid, N-halogen-hydantoin or N-halogen-barbituric acid. In lieu thereof, use may also be made of the corresponding derivative of a primary or secondary carboxylic acid amide, such as of acetamide, propionamide or diacetamide, or of a carboxylic acid anilide, for example, of a nuclearly halogenated or nitrated acetanilide or benzanilide.

The N-halogen-succinimide is especially preferred. The reactants in most cases are employed in substantially stoichimetric quantities, or with a slight excess of the N-halogen-succinimide. It is an especial advantage of this process that it is unnecessary to use more than approximately a 10% excess of the halogenating agent in order to obtain satisfactory yields of the 6-halogen derivative. Due to the reactivity at the 6-position of the 9α-halogen-$\Delta^{1,3,5}$-pregnatriene-3-enol-ester, preferential halogenation occurs at this position without appreciable loss of the halogenating agent due to unwanted side reactions.

In a preferred embodiment of our invention, the 9α-halogen-$\Delta^{1,3,5}$-pregnatriene-3-enol-ester is reacted with N-chloro-succinimide in an inert solvent or diluent, for example, glacial acetic acid. The reaction is preferably conducted under mildly acidic conditions. Optimum acidity for this reaction may be maintained by adding to the reaction mixture a small amount of anhydrous HCl. The anhydrous HCl is suitably added in an inert liquid which is a good solvent for the anhydrous HCl and which will maintain the reaction mixture in a liquid condition at the temperature employed. Approximately a 5% solution of anhydrous HCl in a solvent such as acetic anhydride or a tetrahydrofuran has been found satisfactory. The reaction temperature is suitably maintained in the range of about −20° to +10° C. An ice bath which maintains the temperature at 0–5° C. may be employed. The reaction is generally completed in about one hour, but use of longer reaction times will lead to no deleterious results.

The products formed by this process may be isolated and purified by the usual methods. Ordinarily, the 6-chloro derivative is recovered, not as the 6-chloro derivative of the 9α-halogen-$\Delta^{1,3,5}$-pregnatriene-3-enol-ester, but as the 6-chloro-9α-halogen-$\Delta^{1,4}$-pregnadiene-3-one, since under the reacting conditions, the 3-enol-ester of the 9α-halogen-$\Delta^{1,3,5}$-pregnatriene readily undergoes solvolysis to the 3-hydroxyl group, which then rearranges to the keto form, i.e. the 9α-halogen-$\Delta^{1,4}$-pregnadiene-3-one.

The 9α-halogen-$\Delta^{1,4}$-pregnadiene-3-ones used as starting material may contain any desired substituents, particularly the keto, hydroxy, acetoxy, alkoxy, aryloxy or halogen atoms at other positions in the steroid ring. It is an advantage of this invention that an 11-hydroxy or 11-keto group is unaffected under the reacting conditions employed. It is known that the 11β-hydroxyl group is not ordinarily subjected to acylation except under such severe conditions as to cause destruction of the molecule, particularly at the 17-side chain. Chlorination of the steroid containing an 11-keto group can be expected to occur elsewhere than at the C–11 keto position because of the well known inertness of the 11-keto groups in general. The presence of a 9α-halogen substituent appears to promote the formation of the 3-enol-ester, and, hence, the production of the 6-chloro derivatives produced therefrom.

Reactive hydroxyl groups, for example, a 21-hydroxyl group in the side chain, are preferably converted to the corresponding ester or ether prior to their use as starting materials for the process of this invention. The 21-hydroxyl may be converted into a 21-hydroxy ester by means of suitable esterifying agents, for example, carboxylic or sulfonic acid chlorides of acids such as acetic acid, propionic acid, benzoic acid, methane sulfonic acid and toluene sulfonic acid. The 21-hydroxyl group may be converted to the 21-hydroxy ether by means of the usual etherifying agents.

The invention will be illustrated in greater detail in conjunction with the following specific examples which are illustrative only, but it is not limited to the details thereof.

*Example 1*

A solution of 4.0 g. (9.28 moles) of 9α-fluoro-16α-methyl - $\Delta^{1,4}$ - pregnadiene - 17α,21 - diol - 3,11,20 - trione-21-acetate and 1.0 g. of p-toluenesulfonic acid monohydrate in 200 ml. of acetic anhydride was heated at 95° C. for five hours. The reaction mixture was then concentrated to small volume under reduced pressure and the residue was decomposed with aqueous sodium bicarbonate. The mixture was extracted with chloroform. The extracts were washed with water, dried over anhydrous magnesium sulfate, and concentrated to an oil. Separation of the components of the product was accomplished by adsorption on 30 g. of acid-washed alumina. Elution with ethyl ether afforded 0.88 g. of 9α-fluoro-16α-methyl - $\Delta^{1,3,5}$ - pregnatriene - 3,17α,21 - triol - 11,20-dione, 3,17α,21-triacetate; M.P. 189–92°;

$$\lambda_{max.}^{MeOH} \ 300 \ m\mu; \ E\% \ 105$$

*Analysis.*—Calc'd for $C_{28}H_{33}O_8F$: C, 65.10; H, 6.44. Found: C, 65.37; H, 6.42.

Further elution with chloroform yielded 2.7 g. of 9α-fluoro - 16α - methyl - $\Delta^{1,4}$ - pregnadiene - 17α,21 - diol-3,11,20-trione, 17α,21-diacetate, M.P. 220–30°;

$$\lambda_{max.}^{MeOH} \ 235 \ m\mu$$

E% 329; $[\alpha]_D^{21}$ +81° (CHCl$_3$).

*Analysis.*—Calc'd for $C_{26}H_{31}O_7F$: C, 65.79; H, 6.58. Found: C, 66.03; H, 6.48.

*Example 2*

A solution of 50 mg. of 9α-fluoro-16α-methyl-$\Delta^{1,3,5}$-pregnatriene - 3,17α,21 - triol - 11,20 - dione, 3,17α,21-triacetate and 14 mg. of N-chlorosuccinimide (10% excess) in 3 ml. of glacial acetic acid and 2 ml. of 5% anhydrous hydrogen chloride in acetic anhydride was stored in an ice bath for 3 hours. The reaction mixture was then poured into water and extracted with chloroform. After washing the extracts with water, 5% sodium bisulfite, 5% sodium bicarbonate and water, the chloroform solution was dried over anhydrous sodium sulfate and concentrated to a crystalline residue. After recrystallization, the product, 6α-chloro-9α-fluoro-16α-methyl - $\Delta^{1,4}$ - pregnadiene - 17α,21 - diol - 3,11,20-trione-17α,21-diacetate, had a M.P. 199–200°;

$$\lambda_{max.}^{MeOH} \ 236 \ m\mu$$

E% 332; $[\alpha]_D^{22}$ +45° (CHCl$_3$).

*Analysis.*—Calc'd for $C_{26}H_{30}O_7FCl$: C, 61.35; H, 5.94; Cl, 6.97. Found: C, 61.44; H, 6.64; Cl, 6.45.

*Example 3*

A solution of 2.0 g. of 9α-fluoro-16α-methyl-$\Delta^{1,4}$- pregnadiene-11β-,17α,21-triol-3,20-dione-21-acetate in 8 ml. of pyridine and 5 ml. of benzoyl chloride was warmed at 50° for 3 hours. It was then cooled, poured into 5% aqueous NaHCO$_3$ and extracted with chloroform. The extracts were washed successively with water, 5% HCl, water, 5% NaHCO$_3$, water, then dried over anhydrous sodium sulfate and concentrated to an oily residue. The crude product was adsorbed on 60 g. of acid-washed alumina and subsequently eluted with ethyl ether to afford 1.66 g. of the crystalline enol-benzoate. After recrystallization from acetone-petroleum-ether, the 9α-fluoro-16α-methyl-$\Delta^{1,3,5}$-pregnatriene-3,11β,17α,21-tetrol-20 - one - 3-benzoate-21-acetate had a melting point of 161–7°;

$$\lambda_{max.}^{CH_3OH} \ 224 \ m\mu$$

E% 374; 283 mμ; E% 96; 307 mμ; E% 123.

*Example 4*

A suspension of 100 mg. of the 9α-fluoro-16α-methyl-$\Delta^{1,3,5}$-pregnatriene-3,11β,17α,21-tetrol-20 - one - 3 - benzoate- 21-acetate in 2 ml. of glacial acetic acid was cooled to about 15° C. prior to the addition of 28 mg. of N-chlorosuccinimide and a 5% solution of dry hydrogen chloride in 2 ml. of dry tetrahydropyran. The resulting solution was stored at 0–5° for 2½ hours and then distributed between chloroform and 5% aqueous NaHCO$_3$. The ChCl$_3$ layer was separated and washed with successive portions of water, 5% NaHSO$_3$, and water. It was then dried over MgSO$_4$ and concentrated to a colorless oil which crystallized after trituration with ether. Recrysalization from a mixture of acetone and ethyl ether afforded crystals of 6α-chloro-9α-fluoro-16α-methyl-Δ$^{1,4}$-pregnadiene-11β,17α,21-triol-3,20-dione-21-acetate, M.P. 186–96°;

$\lambda_{max.}^{CH_3OH}$ 240 mμ E% 320

Various changes and modifications may be made in the present invention, certain preferred embodiments of which are herein disclosed, without departing from the scope thereof; to the extent that these changes and modifications are within the scope of the appended claims, they are to be considered a part of this invention.

We claim:

1. 9α - fluoro - 16α - methyl - Δ$^{1,3,5}$ - pregnatriene-3,17α,21-triol-11,20-dione-3,17α,21-triacetate.

2. 9α - fluoro - 16α - methyl - Δ$^{1,3,5}$- pregnatriene-3,11β-17α,21-tetrol-20-one-3-benzoate-21-acetate.

3. Process for the preparation of 9α-fluoro-16α-methyl-Δ$^{1,3,5}$-pregnatriene-3,17α,21-triol-11,20-dione 3,17α,21-triacetate by heating 9α-fluoro-16α-methyl-Δ$^{1,4}$-pregnadiene-17α,21-diol-3,11,20-trione 21-acetate with p-toluenesulfonic acid monohydrate and acetic anhydride at a temperature of about 90–100° C. for several hours.

4. The process which comprises reacting a 9α-fluoro-11,17-bisoxygenated-21-ol-Δ$^{1,4}$-pregnadiene-3,20-dione 21-lower hydrocarbon acylate with a lower alkanoic acid anhydride and an organic sulfonic acid at a temperature of about 90–100° C. for several hours to form the corresponding 9α-fluoro-Δ$^{1,3,5}$-pregnatriene-3-ol 3-lower alkanoate.

5. Process for the preparation of 9α-fluoro-16α-methyl-Δ$^{1,3,5}$-pregnatriene-3,11β-17α,21-tetrol-20-one 3-benzoate 21-acetate by heating 9α-fluoro-16α-methyl-Δ$^{1,4}$-pregnadiene-11β,17α,21-triol-3,20-dione 21-acetate with benzoyl chloride in the presence of pyridine at a temperature of about 50° C. for at least one-half hour.

6. The process which comprises reacting a 9α-fluoro-11,17-bisoxygenated-21-ol-Δ$^{1,4}$-pregnadiene-3,20-dione 21-lower hydrocarbon acylate with a lower hydrocarbon carbonyl chloride in the presence of an organic base at a temperature of about 50° C. to form the corresponding 3-lower hydrocarbon carbonyloxy-9α-fluoro-Δ$^{1,3,5}$-pregnatriene.

7. Process for the preparation of 6α-chloro-9α-fluoro-16α-methyl-Δ$^{1,4}$-pregnadiene-17α,21-diol - 3,11,20 - trione 17α,21-diacetate by reaction of 9α-fluoro-16α-methyl-α$^{1,3,5}$-pregnatriene-3,17α,21-triol - 11,20-dione 3,7α,21-triacetate with N-chlorosuccinimide.

8. Process for the preparation of 6α-chloro-9α-fluoro-16α-methyl-Δ$^{1,4}$-pregnadiene-11β,17α,21 - triol-3,20-dione 21-acetate by reaction of 9α-fluoro-16α-methyl-Δ$^{1,3,5}$-pregnatriene-3,11β,17α,21-tetrol-20-one 3-benzoate 21-acetate with N-chlorosuccinimide.

9. The process which comprises reacting a 3-lower hydrocarbon carbonyloxy-9α-fluoro-11,17-bisoxygenated-21-ol-Δ$^{1,3,5}$-pregnatriene 20-one 21-lower hydrocarbon acylate with a N-halogen substituted dicarboxylic acid imide to form a 6α - halogen - 9α - fluoro-Δ$^{1,4}$-pregnadiene-3-one, wherein said N-halogen group and said corresponding 6α-halogen group are selected from the group consisting of chloro and bromo.

10. A 9α-fluoro-3-lower hydrocarbon carbonyloxy-11,17-bisoxygenated-21-ol-Δ$^{1,3,5}$ - pregnatriene 20-one-21-lower hydrocarbon acylate compound.

11. A 9α-fluoro-3-lower hydrocarbon carbonyloxy-21-lower hydrocarbon acyloxy-11-oxygenated-Δ$^{1,3,5}$-pregnatriene-20-one compound having a 17α-substituent selected from the group consisting of hydroxy and acetoxy.

References Cited in the file of this patent

UNITED STATES PATENTS

| 2,816,902 | Gould et al. | Dec. 17, 1957 |
| 2,819,264 | Gould et al. | Jan. 7, 1958 |
| 2,908,696 | Nussbaum et al. | Oct. 13, 1959 |
| 2,951,840 | Ringold et al. | Sept. 6, 1960 |

OTHER REFERENCES

Arth et al.: 80 J.A.C.S., 3160–62 (1958).
Ringold et al.: 80, J.A.C.S., 6464 (1958).
Edwards et al.: 81, J.A.C.S., 3156–57 (1959).